(12) United States Patent
Hama et al.

(10) Patent No.: US 7,084,896 B2
(45) Date of Patent: *Aug. 1, 2006

(54) MULTI-BEAM SCANNING DEVICE

(75) Inventors: Yoshihiro Hama, Saitama-ken (JP); Susumu Mikajiri, Chiba-ken (JP); Yasushi Suzuki, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 672 days.

This patent is subject to a terminal disclaimer.

(21) Appl. No.: 09/817,339

(22) Filed: Mar. 27, 2001

(65) Prior Publication Data

US 2001/0026392 A1    Oct. 4, 2001

(30) Foreign Application Priority Data

Mar. 30, 2000    (JP)    .............................. 2000-092692

(51) Int. Cl.
*B41J 27/00*    (2006.01)

(52) U.S. Cl. ...................... 347/241; 347/256

(58) Field of Classification Search ................ 347/115, 347/118, 241–245, 256–261, 134; 359/196, 359/204, 206, 216; 385/36
See application file for complete search history.

(56) References Cited

U.S. PATENT DOCUMENTS

| | | | | |
|---|---|---|---|---|
| 5,181,137 A | | 1/1993 | Koide | ......................... 359/217 |
| 5,563,647 A | * | 10/1996 | Fisli | ........................... 347/232 |
| 5,757,413 A | * | 5/1998 | Andrews | ...................... 347/256 |
| 6,115,164 A | * | 9/2000 | Kamikubo | ................... 359/196 |
| 6,219,168 B1 | * | 4/2001 | Wang | .......................... 359/216 |
| 6,304,360 B1 | * | 10/2001 | Sekikawa | .................... 359/204 |
| 6,317,245 B1 | | 11/2001 | Hama et al. | ................ 359/204 |
| 6,346,957 B1 | * | 2/2002 | Maruyama | ................... 347/115 |
| 6,392,772 B1 | | 5/2002 | Hama et al. | ................ 359/204 |
| 6,392,773 B1 | | 5/2002 | Hama et al. | ................ 359/204 |
| 6,473,105 B1 | * | 10/2002 | Tanaka et al. | .............. 347/118 |
| 6,636,340 B1 | * | 10/2003 | Hama et al. | ................ 359/204 |

FOREIGN PATENT DOCUMENTS

JP    02-58015    2/1990

* cited by examiner

*Primary Examiner*—Hai Pham
(74) *Attorney, Agent, or Firm*—Greenblum & Bernstein, P.L.C.

(57) ABSTRACT

A multi-beam scanning device is provided with a light source that emits a plurality of light beams, a polygonal mirror that deflects the light beams to scan, and an optical system that converges the deflected light beams on a plurality of objects to be scanned. The objects are arranged on a side, with respect to the polygonal mirror, in which the light beams scan, from a position closer to the polygonal mirror to a position farther from the polygonal mirror in order. The optical system further includes a plurality of optical path turning systems that turn optical paths of the deflected light beams, respectively. Each of the optical path turning systems includes a plurality of reflection surfaces, the numbers of the reflection surfaces of the optical path turning systems are all even, or odd.

15 Claims, 7 Drawing Sheets

MULTI-BEAM SCANNING DEVICE

BACKGROUND OF THE INVENTION

The present invention relates to a multi-beam scanning device for scanning a plurality of beams, which are emitted by a plurality of light sources, on objects to be scanned.

A scanning device employed in a monochromatic laser printer or the like, which forms an image in accordance with an electrophotographic imaging method, is typically provided with a laser diode, which is driven in accordance with an image signal to emit a modulated beam. A laser beam emitted by the laser diode, as modulated, is collimated by a collimating lens, deflected by a polygonal mirror to scan within a predetermined angular range, for example, in a horizontal direction. The scanning beam is refracted and converged by an fθ lens, and incident on an object, for example, a photoconductive drum so that the surface of the photoconductive drum is exposed to light in accordance with the image signal, thereby a latent image is formed thereon.

The latent image is developed as toner is applied. The developed image, i.e., the toner image is transferred onto a recording sheet, and fixed thereon.

A color printer or a color copier, which forms a color image in accordance with the electrophotographic imaging method, is also known.

Among various types of color printers or copiers, one employing a scanning device, which is provided with a plurality of light sources for respective color components, is known. Such a scanning device (which will be referred to as a multi-beam scanning device hereinafter) is provided with, for example, four light sources (laser diodes) respectively corresponding to yellow, magenta, cyan and black components of an image, and four fθ lenses for respective color components. Four photoconductive drums for the four color components are provided, and the laser beams emitted by the four laser diodes are incident on the four photoconductive drums through the four fθ lenses, respectively.

The above-described exposing, developing and transferring procedure of the electrophotographic method are performed for each color component, the four toner images for the four color components are overlaid in the transferring process, and finally, the fixing process is performed for fixing the overlaid toner images of all the color components on a recording sheet.

In the multi-beam scanning device, it is necessary that the distance between the photoconductive drums is relatively long. Downsizing of electrophotographic processing units, such as discharging unit, charging unit, developing unit and transferring unit is limited, and it is preferable that a space surrounding the photoconductive drum is large. Further, it is also preferable that a toner container which supplies toner to the developing unit is large. If the toner container is large, the toner is to be refilled less frequently.

On the other hand, for an optical system including the fθ lenses, it is important that an optical path length from a polygonal mirror to each photoconductive drum should be made as short as possible. If the optical path length is longer, the fθ lens should be made larger, and therefore, the entire device should be made larger.

Each beam is deflected by the polygonal mirror and incident on a photoconductive drum through an optical system including a plurality of optical elements. Due to the configuration of the optical components, a bow, i.e., a curvature of a scanning line in an auxiliary scanning direction may occur. If the characteristics of the optical systems for the four beams are different, and in particular, if the curved direction of at least one scanning line is opposite to the other scanning lines, the resultant color image may be significantly deteriorated in comparison with a case where all the bows curve in the same direction.

SUMMARY OF THE INVENTION

It is therefore an object of the present invention to provide an improved multi-beam scanning device, in which a distance between objects to be scanned can be made relatively wide, and an optical path length from the polygonal mirror to each object to be scanned can be minimized so that the entire device can be downsized, and an influence of bows as described above can be suppressed.

For the above object, according to an aspect of the invention, there is provided a multi-beam scanning device, which is provided with a light source that emits a plurality of light beams, a polygonal mirror that deflects the light beams emitted by the light source to scan, and an optical system that converges the deflected light beams on a plurality of objects to be scanned. The plurality of objects are arranged on a side, with respect to the polygonal mirror, in which the light beams scan, from a position closer to the polygonal mirror to a position farther from the polygonal mirror in order. Further, the optical system includes a plurality of optical path turning systems that turn optical paths of the deflected light beams, respectively, optical path lengths of the optical paths of the deflected light beams being the same. In this configuration, each of the optical path turning systems includes a plurality of reflection surfaces, the numbers of reflections surfaces of each of the optical path turning systems is even. Alternatively, the numbers of reflection surfaces of each of the optical path turning system is odd.

With this configuration, even if the bows occur due to characteristics of optical elements of the scanning device, the influence thereof is suppressed since all the scanning lines are curved in the same direction. Therefore, if such a scanning device is employed, for example, in a color laser beam printer using a plurality of beams for respective color components, the resultant image is less influenced by the bows.

Optionally, the multi-beam scanning device may include an fθ lens having a first lens, a second lens and a plurality of third lenses. All the deflected light beams pass through the first lens and the second lens, while the light beams deflected and passed through the first and second lenses are directed to respective ones of the third lenses. The plurality of optical path turning systems are provided between the second lens and the third lenses such that the plurality of light beams that emerge from the second lens are directed to the third lens by the optical path turning systems, respectively.

Optionally, each of the optical path turning systems may include a first reflection surface and a second reflection surface. The light beams emerged from the second lens are first incident on the first reflectin surfaces of respective optical path turning systems, and directed to respective third lenses by a plurality of optical paths including (1) a first optical path defined between the second lens and the first reflection surface, (2) a second optical path defined between the first reflection surface and the second reflection surface, and (3) a third optical path defined between the second reflection surface and the objects.

In this case, the third optical path of the plurality of optical paths of the beam directed to one of the plurality of objects located closest to the polygonal mirror may pass a position between the polygonal mirror and the first lens.

Still optionally, at least one of the optical path turning systems may include a first mirror and a second mirror, the first reflection surface being a reflection surface of the first mirror, the second reflection surface being a reflection surface of the second mirror.

Alternatively, at least one of the optical path turning systems may include a prism having two reflection surfaces, the first reflection surface being one of the reflection surfaces of the prism, the second reflection surface being another of the reflection surfaces of the prism.

Further alternatively, at least one of the optical path turning systems may include a prism having a reflection surface and a mirror having a reflection surface, the first reflection surface being one of the reflection surfaces of the prism and the mirror, the second reflection surface being another of the reflection surfaces of the prism and the mirror.

Optionally, each of the optical paths is configured such that the third optical path intersects with the first optical path.

Still optionally, each of the optical path is configured such that the beam proceeding along the second optical path is directed on an opposite side, with respect to the first optical path, of the objects to be scanned.

Further optionally, the first lens may have a positive power mainly in the main scanning direction in which the plurality of light beams scan.

Further, the second lens may have a positive power only in a main scanning direction in which the plurality of light beams scan.

Furthermore, each of the third lenses may have a positive power mainly in an auxiliary scanning direction, which is perpendicular to a main scanning direction where the plurality of the light beams scan.

According to another aspect of the invention, there is provided a multi-beam scanning device, which is provided with a light source that emits a plurality of light beams, a polygonal mirror that deflects the light beams emitted by the light source to scan, and an optical system that converges the deflected light beams on a plurality of objects to be scanned. The plurality of objects are arranged on a side, with respect to the polygonal mirror, in which the light beams scan, from a position closer to the polygonal mirror to a position farther from the polygonal mirror in order. Further, the optical system includes a plurality of optical path turning systems that turn optical paths of the deflected light beams, respectively, optical path lengths of the optical paths of the deflected light beams being the same. In this configuration, each of the optical path turning systems includes a plurality of reflection surfaces, the numbers of reflections surfaces of each of the optical path turning systems is the same.

With this configuration, even if the bows occur due to characteristics of optical elements of the scanning device, the influence there of appear in the same direction. Therefore, if such a scanning device is employed, for example, in a color laser beam printer using a plurality of beams for respective color components, the resultant image is less influenced by the bows.

BRIEF DESCRIPTION OF THE ACCOMPANYING DRAWINGS

The present invention is further explained in the description which follows with reference to the drawings, illustrating, by way of non-limiting examples, various embodiments of the invention, with like reference numerals representing similar parts throughout the several views.

FIG. 1 schematically shows a plan view of a multi-beam scanning device according to a first embodiment of the invention;

DETAILED DESCRIPTION OF THE EMBODIMENT

Hereinafter, multi-beam scanning devices according to embodiments of the present invention will be described with reference to the accompanying drawings. In each embodiment, the multi-beam scanning device is described as a device employed in a color printer.

First Embodiment

Figure 1:
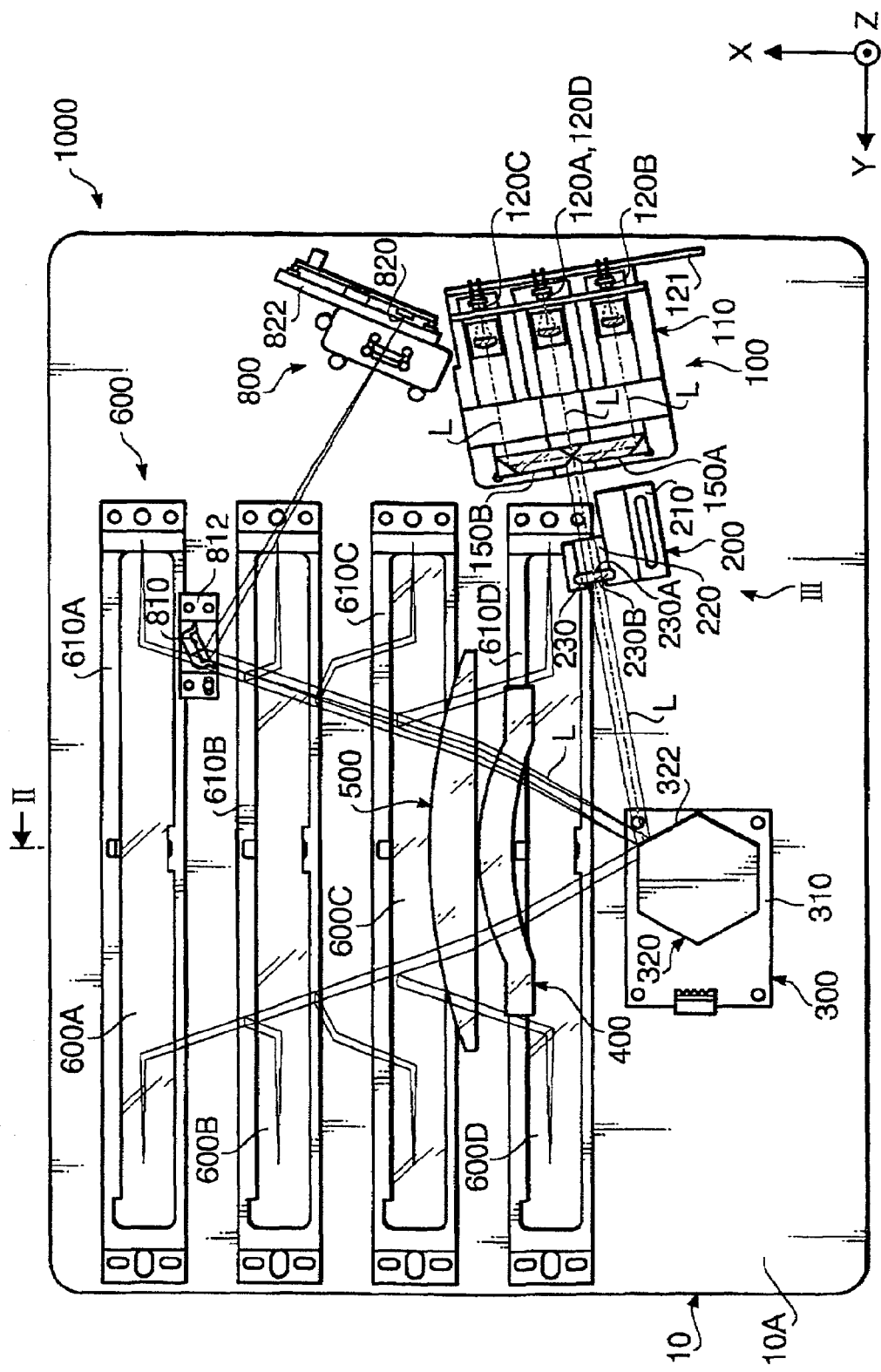
Figure 2:
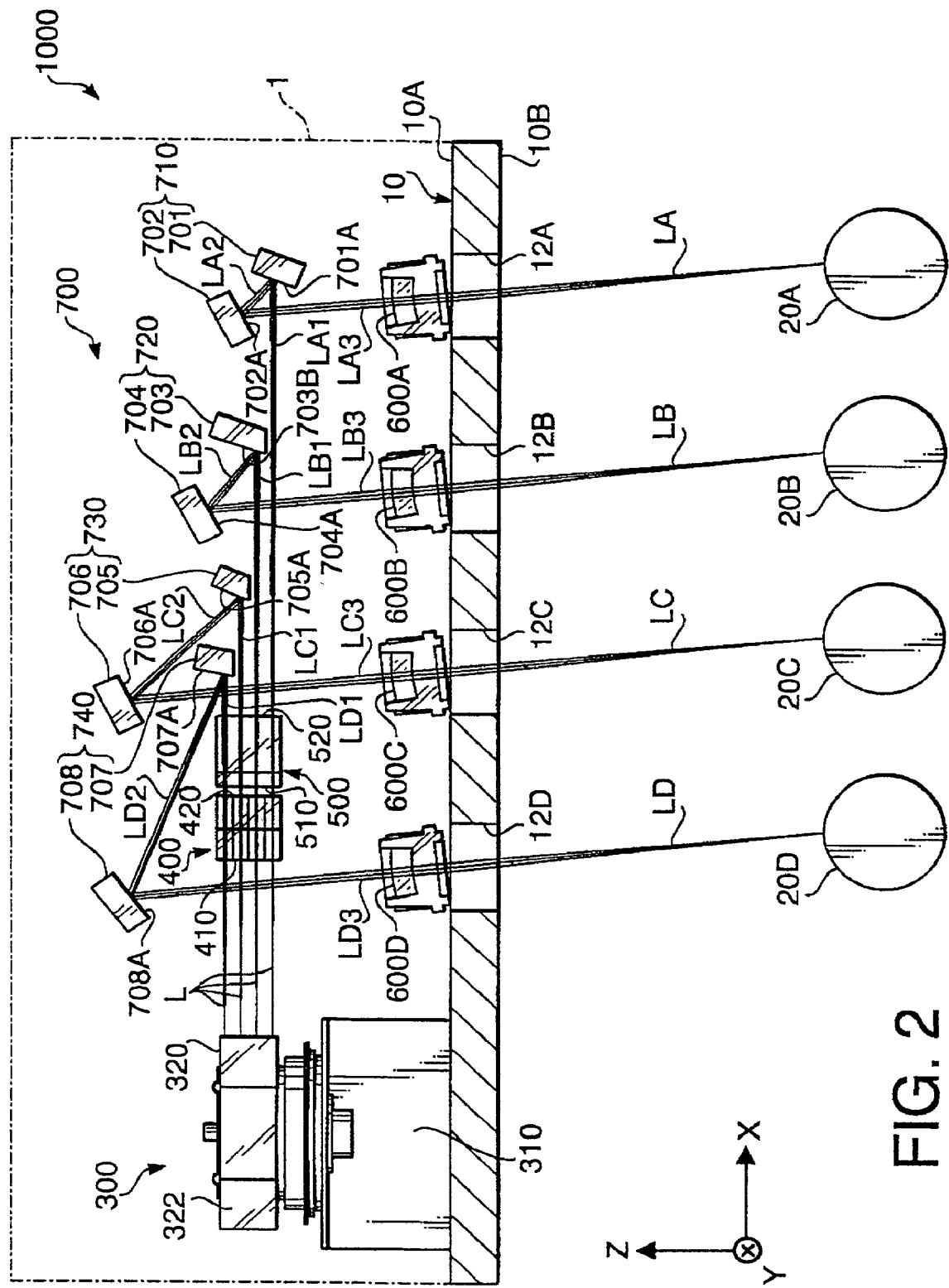
FIG. 2 is a cross sectional side view of the multi-beam scanning device taken along line II—II in FIG. 1.

FIG. 1 schematically shows a structure of a multi-beam scanning device 1000 according to a first embodiment of the invention. FIG. 2 is a cross sectional side view of the multi-beam scanning device 1000 taken along line II—II in FIG. 1.

In the drawings, for clarifying directions referred to in the following description, an XYZ coordinate system is introduced. An X-Y plane extends horizontally when the multi-beam scanning device 1000 is in use, and a Z-axis direction is a vertical direction.

The multi-beam scanning device 1000 includes a housing 1 (see FIG. 2) having a bottom plate 10. On an upper surface 10A of the bottom plate 10, a light source unit 100, a cylindrical lens unit 200, a polygonal mirror unit 300, a first lens 400, a second lens 500, third lenses 600A–600D, an optical path turning system 700 (which is shown only in FIG. 2), a horizontal synchronizing signal detecting unit 800, and the like are provided. The first, second and third lenses 400, 500 and 600 constitute an fθ lens.

As shown in FIG. 2, the bottom plate 10 extends in the horizontal direction (a direction parallel with the X-Y plane).

Below a lower surface 10B of the bottom plate 10, four photoconductive drums 20A, 20B, 20C and 20D are provided spaced apart from the lower surface 10B, such that the four photoconductive drums 20A, 20B, 20C and 20D are spaced from each other in the horizontal direction (i.e., in the X-axis direction). The photoconductive drums 20A, 20B, 20C and 20D are rotatably supported about respective rotational axes thereof, which are arranged in parallel and spaced apart from each other. The photoconductive drums 20A, 20B, 20C and 20D are arranged, in the X-axis direction, on one side of the polygonal mirror 300, in the order of 20D, 20C, 20B and 20A. The photoconductive drum 20D is closest to the polygonal mirror unit 300 among the four, and the photoconductive drum 20A is the farthest from the polygonal mirror unit 300.

It should be noted that optical paths of the beams L deflected by the polygonal mirror 300 are located, when viewed along the Z-axis, on the same side of the polygonal mirror unit 300, where the photoconductive drums 20A, 20B, 20C and 20D are arranged.

The photoconductive drum 20D, which is closer to the polygonal mirror 300 than the other photoconductive drums 20A–20C, is located, when viewed along the Z-axis, between the first lens 400 and the polygonal mirror unit 300. The third lens 600D, which is closer to the polygonal mirror unit 300 than the other third lenses 600A–600C, is located, when viewed in the Z-axis direction, between the polygonal mirror unit 300 and the first lens 400.

The four photoconductive drums 20A, 20B, 20C and 20D are provided for different color components, yellow, magenta, cyan and black components, respectively. That is, from the photoconductive drums 20A, 20B, 20C and 20D, yellow, magenta, cyan and black toner images are to be transferred onto a recording sheet, respectively.

Operation of the multi-beam scanning device 1000 will be described.

Four laser beams L are emitted from the light source unit 100. The four laser beams L pass through the cylindrical lens 230 of the cylinder lens unit 200, and are deflected by the polygonal mirror unit 300 to scan.

The scanning beams L are converged on the photoconductive drums 20A, 20B, 20C and 20D, respectively, via the first lens 400, the second lens 500, the optical path turning system 700 and respective third lenses 600.

Each of the scanning beams L deflected by the polygonal mirror unit 300 is directed to the horizontal signal detecting unit 800. Based on the detection (i.e., the output signal) by the horizontal signal detecting unit 800, a drawing starting timing of each beam in the main scanning direction is synchronized.

It should be noted that the main scanning direction of each beam L is parallel with the axial direction of the photoconductive drums 20A, 20B, 20C and 20D. A direction perpendicular to the main scanning direction will be referred to as an auxiliary scanning direction.

Next, each unit will be described in detail.

The light source unit 100 includes:

four laser diodes 120A, 120B, 120C and 120D, which emit the laser beams having substantially the same wavelength;

four collimating lenses for collimating the laser beams L emitted by the laser diodes 120A–120D, respectively; and a laser diode driving circuit for driving the laser diodes 120A–120D.

The light source unit 100 is constructed such that the laser beams L that emerge from the collimating lenses are on the same plane that is perpendicular to an X-Y plane, and spaced from each other in the Z-axis direction by a predetermined distance.

The cylindrical lens unit 200 includes:

a base 210 secured on the upper surface 10A of the wall 10;

a lens holding unit 220 standing on the base 210; and the cylindrical lens 230 held by the lens holding unit 220.

Figure 3:
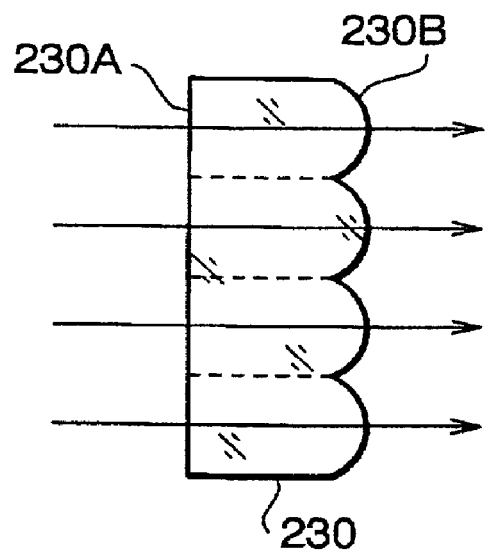
FIG. 3 is a cross sectional side view of a cylindrical lens employed in the multi-beam scanning device shown in FIG. 1.

FIG. 3 shows a side view of the cylindrical lens 230. The cylindrical lens 230 is configured such that four cylindrical lens elements are integrally formed.

Each of the cylindrical lens elements has a light receiving surface 230A on which one of the laser beams L emitted from the light source unit 100 is incident, and a light emerging surface 230B from which the laser beam L emerges.

Each of the cylindrical lens elements is configured such that the laser beam L is not converged in the horizontal direction (i.e., in a direction parallel to the X-Y plane), and is converged only in the vertical direction (i.e., in the Z-axis direction). The light beams L that emerge from the cylindrical lens 230 (i.e., cylindrical lens elements) proceed to the polygonal mirror unit 300.

The focal points of the lens elements of the cylindrical lens 230 are substantially on a reflection surface, on which the laser beams L are incident, of the polygonal mirror 320. Thus, on the reflection surface, line-shaped images extending in the horizontal direction are formed by the four laser beams L.

The polygonal mirror unit 300 includes a motor unit 310 secured on the upper surface 10A of the bottom plate 10, and the polygonal mirror 320 secured on a rotational shaft 312 extending in the vertical direction (i.e., the Z-axis direction).

The polygonal mirror 320 is an equilateral hexagon when viewed from the top. Each side of the hexagon (i.e., each side surface of the polygonal mirror 320) is formed as a single flat reflection surface 322, which are perpendicular to the horizontal plane (i.e., the X-Y plane) and parallel to the rotational shaft 312 of the motor unit 310. The laser beams L are incident on each reflection surface 322 as the polygonal mirror 320 rotates.

In FIG. 1, the motor unit 310 is driven to rotate the polygonal mirror 320 counterclockwise at a high and constant speed in accordance with a drive signal transmitted from a motor control circuit (not shown). As the polygonal mirror 320 rotates, each beam L is deflected to scan in a direction from a right-hand side to a left-hand side of FIG. 1.

The first lens 400, together with a second and the third lenses 500 and 600, constitutes an fθ lens. The scanning laser beams L deflected by the polygonal mirror 320 pass through the fθ lens and are converged on the photoconductive drums 20A–20D, respectively.

All the laser beams L deflected by the polygonal mirror 320 are incident on the first lens 400. The first lens 400 is mounted on the upper surface 10A of the bottom plate 10 by means of a holding member. The first lens 400 is composed of a single element formed of a single material.

The first lens 400 has a first surface 410 on which the laser beams L are incident, and a second surface 420 from which the laser beams L emerge (see FIG. 2).

Figure 4:
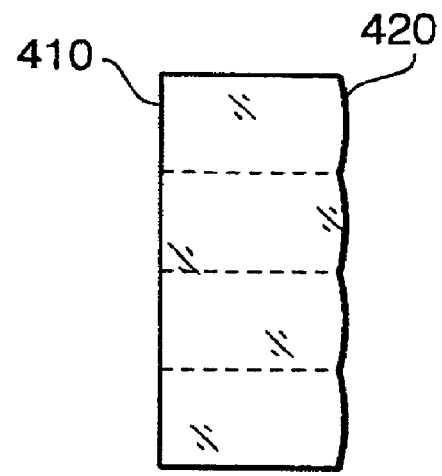
FIG. 4 is a cross sectional side view of a first lens of the multi-beam scanning device shown in FIG. 1.

FIG. 4 shows an enlarged cross-sectional side view of the first lens 400 taken along line II—II of FIG. 1. As shown in FIG. 4, the first surface 410 is a planar surface, and the second surface 420 is formed with four lens structures through which the four beams L pass, respectively.

That is, the four optical paths of the four laser beams L intersect with the four lens structures of the first lens 400, respectively. The four optical paths are spaced from each other in the vertical direction (i.e., the Z-axis direction) by a predetermined amount.

The first lens 400 has a positive power mainly in a main scanning direction (i.e., Y-axis direction), and also has a positive power in the auxiliary scanning direction (i.e., Z-axis direction). It should be noted that the power of the first lens 400 in the auxiliary scanning direction is weaker than that in the main scanning direction.

The second lens 500 has a first surface 510 on which the laser beams L emerged from the first lens 400 are incident, and a second surface 520 from which the laser beams L emerge. The second lens 500 is mounted on the upper surface 10A of the bottom plate 10 by means of a holding member (not shown).

The second lens 500 is a single element formed of single material, and all the laser beams L pass through the second lens 500.

The second lens 500 has a positive power only in the main scanning direction (i.e., in the Y-axis direction), and does not have a power in the auxiliary scanning direction (i.e., in the Z-axis direction).

The optical path turning system 700 is configured to direct the laser beams L emerged from the second lens 500 to respective ones of the third lenses 600A–600D. The optical path turning system 700 includes first to fourth turning optical systems 710, 720, 730 and 740 respectively for reflecting incident beams.

The first turning optical system 710 includes a first mirror 701 and a second mirror 702. The first mirror 701 is arranged such that the lowermost beam of the beams L emerged from the second surface 520 of the second lens 500 is directed to the second mirror 702, while the second mirror 702 is arranged such that the beam directed from the first mirror 701 is directed toward the photoconductive drum 20A which is located at the farthest position from the polygonal mirror 320. The optical path of the lowermost beam from the polygonal mirror 320 to the photoconductive drum 20A is defined as an optical path LA.

The second turning optical system 720 includes a third mirror 703 and a fourth mirror 704, which are arranged such that the second lowest beam of the beams L is reflected and directed to the photoconductive drum 20B located at second farthest position from the polygonal mirror 320. The optical path of the second lowest beam from the polygonal mirror 320 to the photoconductive drum 20B is defined as an optical path LB.

The third turning optical system 730 includes a fifth mirror 705 and a sixth mirror 706, which are arranged such that the third lowest beam of the beams L is reflected and directed to the photoconductive drum 20C, which is located at third farthest position from the polygonal mirror 320. The optical path of the third lowest beam from the polygonal mirror 320 to the photoconductive drum 20B is defined as an optical path LC.

The fourth turning optical system 740 includes a seventh mirror 707 and an eighth mirror 708, which are arranged such that the uppermost beam of the beams L is reflected and directed to the photoconductive drum 20D located at the closest position, among the four photoconductive drums 20A–20D, to the polygonal mirror 300. The optical path of the uppermost beam from the polygonal mirror 320 to the photoconductive drum 20D is defined as an optical path LD.

Each of the first through eighth mirrors 701–708 extends in the main scanning direction (i.e., Y-axis direction) so as to reflect the beams L which scan in the main scanning direction. The first through eighth mirrors 701–708 are fixed on the upper surface 10A of the bottom plate 10 at positions shown in FIGS. 1 and 2 by means of securing members (not shown).

Each of the third lenses 600A–600D has a positive power mainly in the auxiliary scanning direction (i.e., the X-axis direction). The third lenses 600A–600D also have power in the main scanning direction (i.e., the Y-axis direction). Each of the third lenses 600A–600D is configured such that the power in the auxiliary scanning direction is greater than the power in the main scanning direction.

On the bottom plate 10, at positions directly above the photoconductive drums 20A–20D, openings 12A–12D, which are through-openings in the direction of the thickness of the bottom plate 10, are formed. Each of the openings 12A–12D extends in the main scanning direction (Y-axis direction), i.e., in parallel with the rotational axes of the photoconductive drums 20A–20D so as to allow the scanning beams L proceeding along the optical paths LA–LD to pass therethrough, respectively.

At end portions, along the Y-axis direction, of the openings 12A–12D, holding members 610A–610D are provided, as shown in FIG. 1, for holding the third lenses 600A–600D, respectively.

As shown in FIGS. 1 and 2, the third lenses 600A–600D respectively receive the four scanning beams L. Each of the third lenses 600A–600D has a first surface on which the scanning beam is incident, and a second surface from which the beam emerges.

Optical paths LA–LD defined by the optical path turning system 700 including the first through eighth mirrors 701–708 will be described in detail hereinafter.

The optical path LA includes:

a first path LA1 defined between the second surface 520 of the second lens 500 and a reflection surface 701A of the first mirror 701;

a second path LA2 defined between the reflection surface 701A of the first mirror 701 and a reflection surface 702A of the second mirror 702; and a third path LA3 defined between the reflection surface 702A and the photoconductive drum 20A.

The beam incident on the reflection surface 701A is reflected obliquely and upwardly to be directed to the reflection surface 702A, and then, reflected thereby downwardly toward the third lens 600A.

The optical path LB includes:

a first path LB1 defined between the second surface 520 of the second lens 500 and a reflection surface 703A of the third mirror 703;

a second path LB2 defined between the reflection surface 703A of the third mirror and a reflection surface 704A of the fourth mirror 704;

a third path LB3 defined between the reflection surface 704A of the fourth mirror 704 and the photoconductive drum 20B.

The beam incident on the reflection surface 703A is reflected obliquely and upwardly to be directed to the reflection surface 704A, and then, reflected thereby downwardly toward the third lens 600B.

The optical path LC includes:

a first path LC1 defined between the second surface 520 of the second lens 500 and a reflection surface 705A of the fifth mirror 705;

a second path LC2 defined between the reflection surface 705A of the fifth mirror 705 and a reflection surface 706A of the sixth mirror 706; and a third path LC3 defined between the reflection surface 706A of the sixth mirror 706 and the photoconductive drum 20C.

The beam incident on the reflection surface 705A is reflected obliquely and upwardly to be directed to the reflection surface 706A, and then, reflected thereby downwardly toward the third lens 600C.

The optical path LD includes:

a first path LD1 defined between the second surface 520 of the second lens 500 and a reflection surface of the seventh mirror 707;

a second path LD2 defined between the reflection surface of the seventh mirror 707 and a reflection surface 708A of the eighth mirror 708; and a third path LD3 defined between the reflection surface 708a of the eighth mirror 708 and the photoconductive drum 20D.

The beam incident on the reflection surface 707A is reflected obliquely and upwardly to be directed to the reflection surface 708A, and then, reflected thereby downwardly toward the third lens 600D.

The second path LD2 of the path LD includes a portion located at the space above the first lens 400 and the second lens 500.

Further, the third path LD3 of the path LD passes through a portion located between the polygonal mirror 320 and the first lens 400.

As afore-mentioned, the first and second lenses 400 and 500 mainly converge the laser beams L in the main scanning direction, and the third lens 600 mainly converges the laser beams L in the auxiliary scanning direction.

The linear images formed substantially on the reflection surface 322 of the polygonal mirror 320 are reflected thereby, and are further converged in both the main and auxiliary scanning directions as passed through the first through third lenses 400, 500 and 600, thereby appropriate beam spots being formed on the photoconductive drums 20A–20D, respectively.

It should be noted that the optical paths LA–LD have the same length so as to ensure that the beams L form the appropriate beam spots on the photoconductive drums 20A–20D, respectively.

The horizontal synchronizing signal detection unit 800 includes a mirror 810 and a photo sensor 820. The mirror 810 is secured on the upper surface 10A of the bottom plate 10 by a securing member 812 as shown in FIG. 1. The photo sensor 820 is secured on the upper surface 10A of the bottom plate 10 by a securing member 822.

The mirror 810 is arranged at a position within a scanning range of the lowermost beam but out of a range contributing to image formation. The mirror 810 is arranged to reflect the incident beam to the photo sensor 820.

By controlling driving signals for the laser diodes 120A through 120D synchronously with the detection signal output by the photo sensor 820, timing for starting image formation on the photoconductive drums 20A–20D can be synchronized.

According to the multi-beam scanning device 1000 constructed as above, the laser beams L emitted by the light source unit 100 and pass through the cylindrical lens 230 are deflected by the reflection surfaces 322 of the polygonal mirror 320 to scan, and directed to the first lens 400. The laser beams L then pass through the first and second lenses 400 and 500, and are directed to the photoconductive drums 20A–20D, via the third lenses 600, along the paths LA–LD, respectively, and the scanning beam spots are formed on the photoconductive drums 20A–20D, respectively.

In the first embodiment described above, in each optical path, two reflection surfaces are provided. Thus, each optical path has a first path from the polygonal mirror to the first reflection surface, a second path between the first and second reflection surfaces, and a third path from the second reflection surface to the photoconductive drum. The second optical path is upwardly inclined with respect to the first path.

Since the two reflection surfaces are provided within an optical path of each beam, by adjusting an arrangement of the two reflection surfaces, the optical path lengths of the four beams L can easily be made equal to each other. Further, fine adjustment of the length of each optical path can also be achieved easily simply by adjusting the positions of the two reflection surfaces.

Further, the third path LD3 of the optical path LD has a portion located between the polygonal mirror 320 and the first lens 400. Accordingly, a distance between the polygonal mirror 320 and the photoconductive drum 20D as well as a distance between the polygonal mirror 320 and the third lens 600D along the X-axis direction can be reduced easily.

Therefore, it is possible to make the length of the optical paths LA–LD the same while providing necessary space between the photoconductive drums 20A–20D. That is, according to the first embodiment, even if the length of the paths LA–LD is minimized, sufficient room can be provided for arranging the discharging unit, charging unit, developing unit and transferring unit for performing the electrophotographic process. Further, since there is sufficient space for providing the above units, a space for providing a toner container can also be obtained. Thus, the capacity of toner of the scanning device can be increased.

Furthermore, since the distance between the polygonal mirror and the photoconductive drums can be reduced, the scanning device can be downsized in comparison with conventional devices.

According to the configuration of the multi-beam scanning device 1000 according to the first embodiment, the influence of the bow, i.e., the curvature of the scanning line on the photoconductive drum in the auxiliary scanning direction can be suppressed.

Figure 5A:
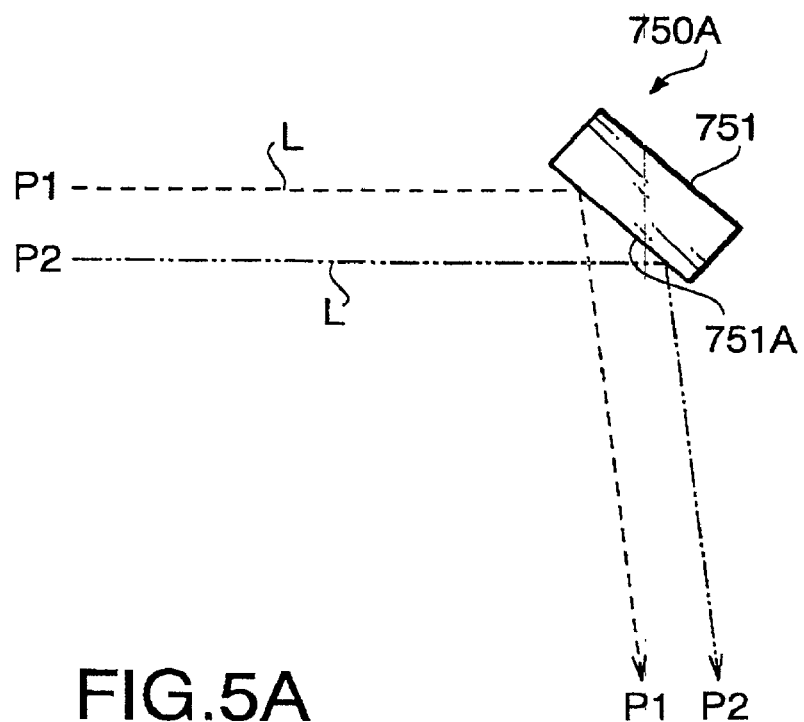
FIGS. 5A and 5B show examples of optical path turning systems having different numbers of reflection surfaces.
Figure 5B:
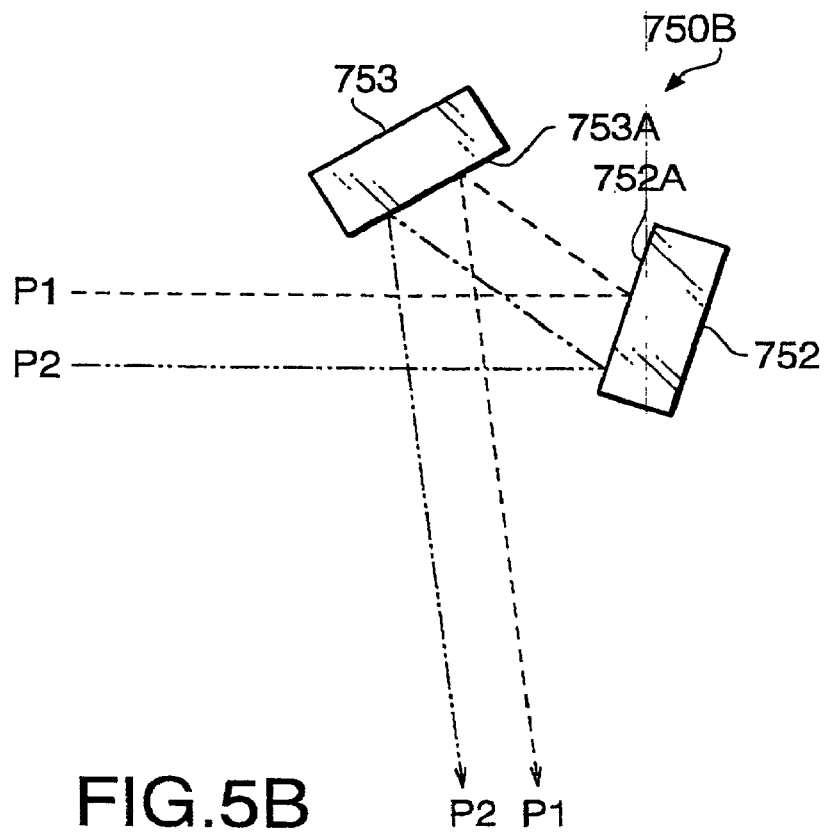
Figure 6:
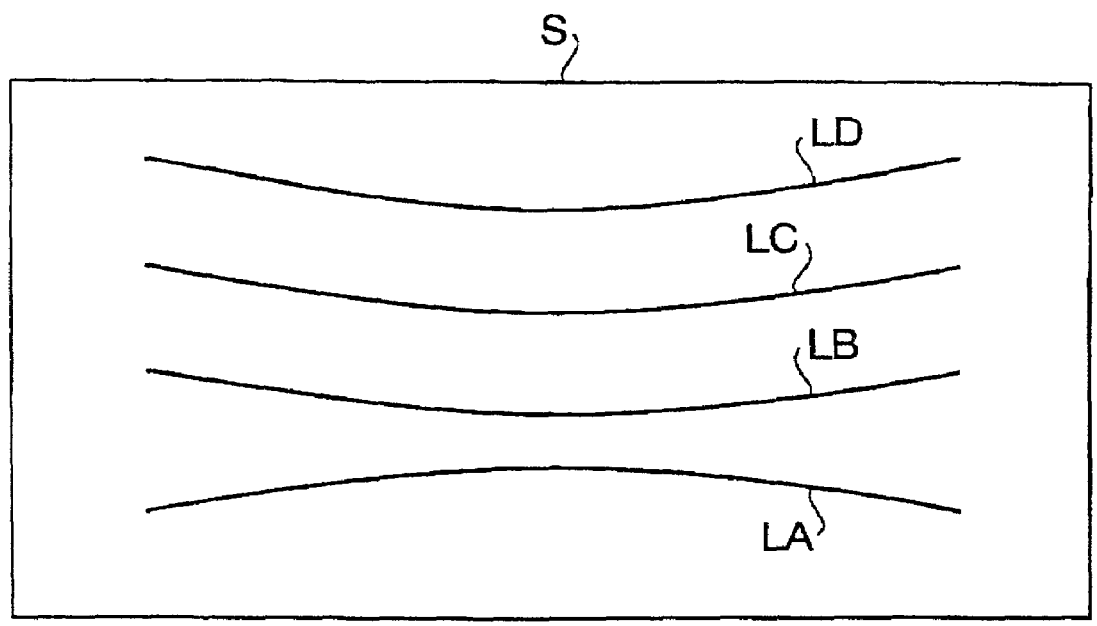
FIG. 6 shows an example of scanning lines for different numbers of reflection surfaces of turning optical systems.

FIGS. 5A and 5B show examples of optical path turning system 700, where FIG. 5A shows an optical system 750A having a single mirror 751, while FIG. 5B shows an optical system 750B having two mirrors 752 and 753. It should be noted that the main scanning direction is perpendicular to a surface of FIGS. 5A and 5B. FIG. 6 shows an example of scanning lines formed on a imaginary plane S which is a plane located at the photoconductive drums 20A–20D.

It is assumed that a beam is incident on the mirror 751 or 752 along a path P1 at both ends of a scanning line, and along a path P2 at a central portion of the scanning line. If the turning optical system 700 is the optical system 750A, the scanning line is formed as LA in FIG. 6. The similar scanning line is formed if the turning optical system 700 include an odd number of reflection surfaces. If the turning optical system 700 is the optical system 750B, the scanning line is formed as LB, LC or LD in FIG. 6. The similar scanning line is formed if the turning optical system 700 includes an even number of reflection surfaces.

Therefore, if the optical elements of the multi-beam scanning device have substantially the same characteristics, and each of the turning optical systems 710, 720, 730 and 740 has the same number of reflection surfaces, even if the bows of the scanning lines occur due to the characteristic of the optical elements, the direction thereof are maintained the same, and the influence thereof to the image can be suppressed. It is apparent that if the number of the reflection surfaces of all the turning optical system is even or odd, the influence of the bows can be suppressed. It should be noted that the numbers of the reflection surfaces need not be the same if the above condition (even or odd) is satisfied.

If the first turning optical system 710 includes an odd (or even) number of reflection surfaces, and each of the second, third and fourth turning optical systems 720, 730 and 740 includes an even (or odd) number of reflection surfaces, the scanning lines are formed, for example, as shown in FIG. 6.

Second Embodiment

In the multi-beam scanning device 1000 according to the first embodiment, each turning optical system includes two mirrors. However, the invention need not be limited to such a structure, and at least one of the turning optical system may include, instead of two mirrors, a prism having two reflections surfaces.

Figure 7:
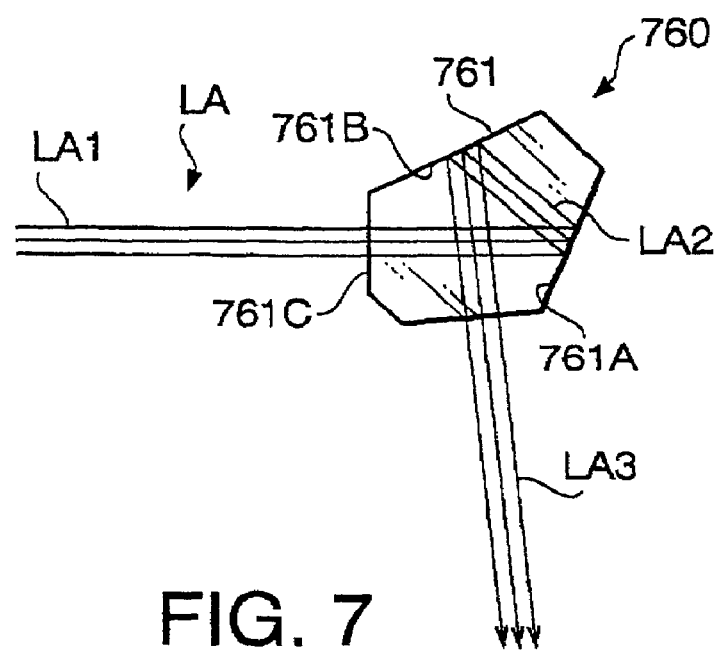
FIG. 7 is a cross sectional side view of a turning optical system according to a second embodiment.

FIG. 7 shows a prism 761 which can be employed as a turning optical system 760 having an even number of reflection surfaces. Specifically, the prism 761 has two reflection surfaces 761A and 761B, which function to direct a beam from the polygonal mirror 320 to a photoconductive drum.

Figure 8:
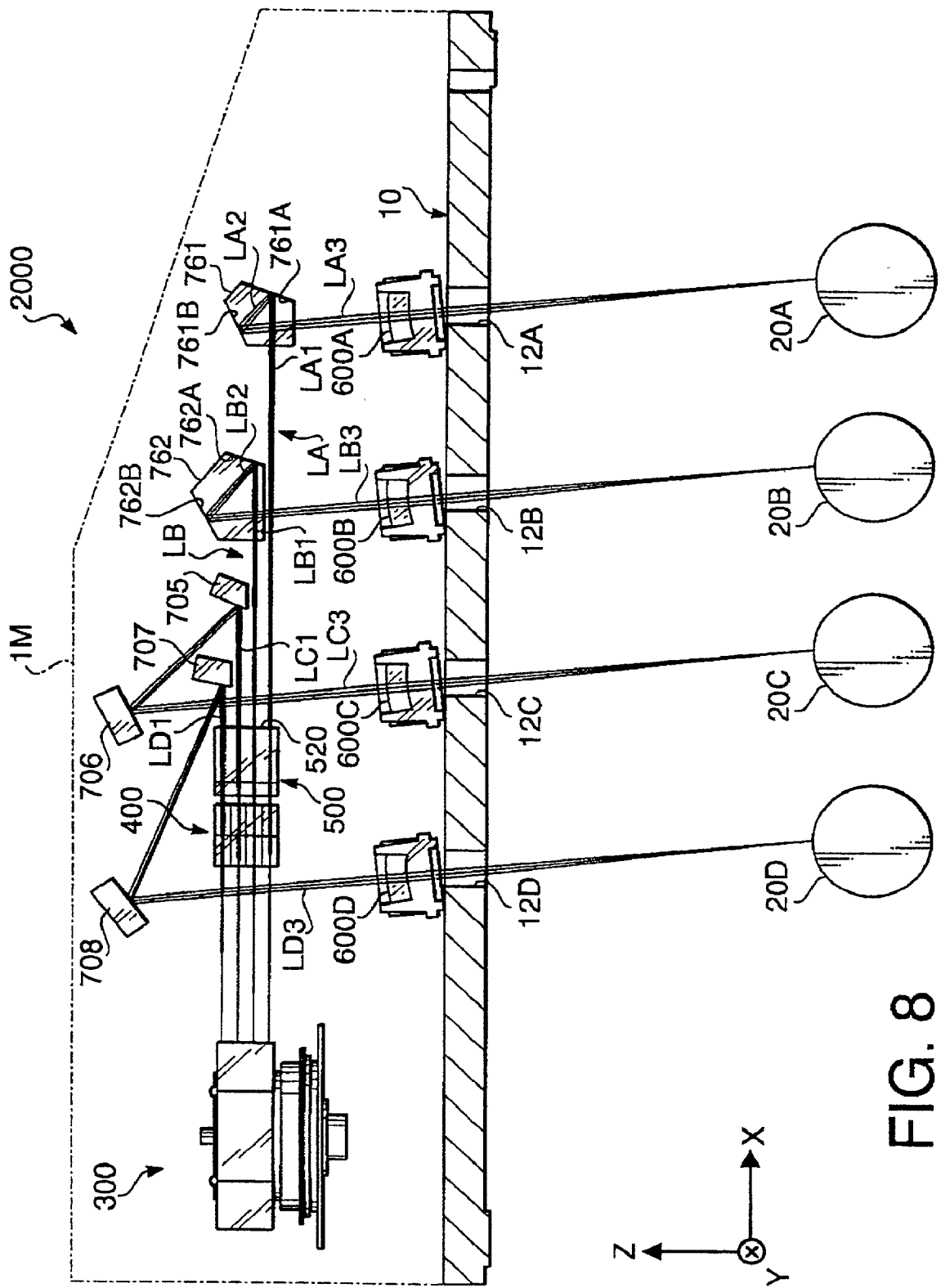
FIG. 8 is a cross-sectional side view of a multi-beam scanning device according to a second embodiment of the invention.

FIG. 8 shows a schematic representation of a multi-beam scanning device 2000 according to the second embodiment of the invention.

The multi-beam scanning device 2000 is similar to the multi-beam scanning device 1000 except that the first and second turning optical systems 710 and 720 are replaced with prisms 761 and 762.

The reflection surface 761A and 761B function similarly to reflection surfaces 701A and 702A of the multi-beam scanning device 1000, respectively. Further, the reflection surfaces 762A and 762B function similarly to the reflection surfaces 703A and 704A, respectively.

As shown in FIG. 8, the optical path LA includes:

the first path LA1 defined between the second surface 520 of the second lens 500 and a reflection surface 761A;

the second path LA2 defined between the reflection surface 761A and the reflection surface 761B; and the third path LA3 defined between the reflection surface 761B and the photoconductive drum 20A.

The beam incident on the reflection surface 761A is reflected obliquely and upwardly to be directed to the reflection surface 761B, and then, reflected thereby downwardly toward the third lens 600A.

Similarly, the optical path LB includes:

the first path LB1 defined between the second surface 520 of the second lens 500 and the reflection surface 762A;

the second path LB2 defined between the reflection surface 762A and the reflection surface 762B; and the third path LB3 defined between the reflection surface 762B and the photoconductive drum 20A.

The beam incident on the reflection surface 762A is reflected obliquely and upwardly to be directed to the reflection surface 762B, and then, reflected thereby downwardly toward the third lens 600B.

In the configuration of the multi-beam scanning device 1000 or 2000, since the optical path LC3 is located closer to the polygonal mirror 320 than the reflection surface 707A, it is impossible to replace the third turning optical system 730 with a prism similar to the prism 761 or 762.

However, the invention is not limited to such a structure, and depending on the configuration of a scanning device, e.g., if the third path LC3 of the optical path LC is farther from the polygonal mirror than the reflection surface 707A, the third turning optical system 730 can also be replaced with a single prism having two reflection surfaces.

Third Embodiment

Figure 9:
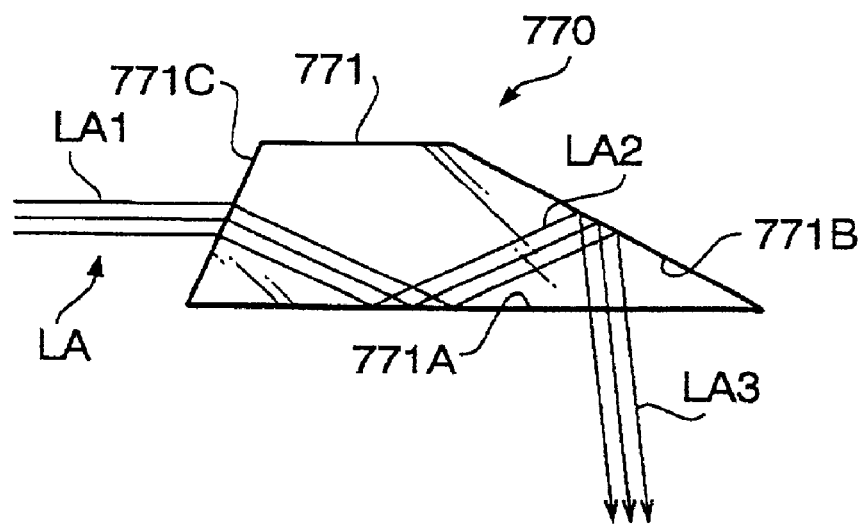
FIG. 9 is a cross sectional side view of a turning optical system according to a third embodiment.

FIG. 9 shows a turning optical system 770 according to a third embodiment of the invention.

As shown in FIG. 9, the turning optical system 770 consists of a single prism 771 having two reflection surfaces 771A and 771B. Since the turning optical system 770 has two reflection surfaces, it can replace, for example, the first turning optical system 710 of the multi-beam scanning device 1000 (see FIG. 2).

The beam proceeding along the first path LA1 is incident on a light receiving surface 771C of the prism 771. The beam is refracted at the light receiving surface 771C to be directed to the first reflection surface 771A and reflected thereby. The reflected beam is incident on the second reflection surface 771B, and then, reflected on the second reflection surface 771B to be directed to the third lens 600A.

In this case, the optical path LA includes:

a first path LA1 defined between the second surface 520 of the second lens 500 and the reflection surface 771A;

a second path LA2 defined between the reflection surface 771A and the reflection surface 771B; and a third path LA3 defined between the reflection surface 771B and the photoconductive drum 20A.

The beam incident on the reflection surface 771A is reflected obliquely and upwardly to be directed to the reflection surface 771B, and then, reflected thereby downwardly toward the third lens 600A.

It should be noted that the second turning optical system of the multi-beam scanning device 1000 can also be replaced with the turning optical system 770. Further, it is of course possible to employ the turning optical system 760 as one of the first and second turning optical systems, and employ the turning optical system 750 as the other one of the first and second turning optical systems in a multi-beam scanning device.

Fourth Embodiment

Figure 10:
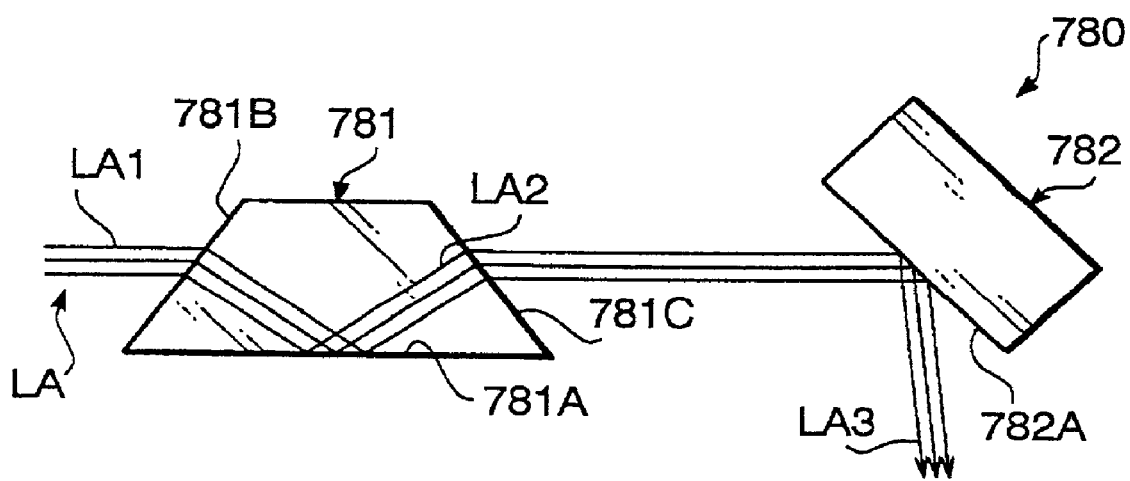
FIG. 10 is a cross sectional side view of a turning optical system according to a fourth embodiment.

FIG. 10 shows another turning optical system 780 consisting of a prism 781 and a mirror 782. The turning optical system 780 can replace, for example, the first turning optical system 710 of the multi-beam scanning device 1000 shown in FIG. 1.

When the turning optical system 780 is used, the beam proceeding along the path LA1 is incident on a surface 781B, where the beam is refracted downward to be directed to the first reflection surface 781A. The beam reflected by the first reflection surface 781A is refracted by a surface 781C, and emerged therefrom to be directed to the mirror 782. The beam is reflected by the second reflection surface 782A and directed to the third lens 600A.

In this case, the optical path LA includes:

a first path LA1 defined between the second surface 520 of the second lens 500 and the reflection surface 771A of the prism 771;

a second path LA2 defined between the reflection surface 771A and a reflection surface 782A of the mirror 782; and a third path LA3 defined between the reflection surface 782A and the photoconductive drum 20A.

The beam incident on the reflection surface 772A is reflected obliquely and upwardly to be directed to the reflection surface 782A, and then, reflected thereby downwardly toward the third lens 600A.

It should be noted that the shape of the prism, the number of mirrors, the combination of prism(s) and mirror(s) are not limited to those described with reference to the drawings, and various types prism(s) and/or mirror(s) can be used for achieving the similar effects. By appropriate design, even the fourth turning optical system 740 shown in FIG. 2 may be replaced with a single prism having two reflection surfaces.

It should be emphasized that the number of the reflection surfaces of each turning optical system should be even. Alternatively, the number of reflection surface of each turning optical system should be odd. With such a configuration, even if the bows of the scanning lines are exhibited for all color components, the influence is in the same directions for all the components, and therefore, the resultant image is less influenced by the bows in comparison with a case where the turning optical systems do not satisfy the above condition.

It should be noted that, in the above-described embodiments, four laser diodes 120A–120D are provided in the light source unit 100, and four laser beams corresponding to four colors (yellow, magenta, cyan, and black) are emitted therefrom. Then, using the first and second lenses 400 and 500, the four beams L are converged in the main scanning direction. The present invention, however, is not limited to this configuration using four beams.

For example, the device can be modified to use three beams corresponding to, for example, yellow, magenta and cyan.

With this construction, if the optical length of the optical path directing the beam to the farthest object is minimized, the other optical paths can easily be adjusted to have the same optical length. Therefore, the distance between the polygonal mirror and each object can be reduced. Further, a sufficient distance between each object can be obtained.

Therefore, the scanning device can be downsized, and sufficient room for arranging the electrophotographic imaging process can be obtained.

In particular, if the reflection surfaces are formed on distinct optical elements, location of which are adjustable, then, by adjusting the location of the optical elements, fine adjustment of the optical path length can be achieved.

Furthermore, in the turning optical systems, all the beams are reflected by even number of times, or alternatively odd number of times. Therefore, influence of bows with respect to the finally formed image can be suppressed.

The present disclosure relates to the subject matter contained in Japanese Patent Application No. 2000-092692, filed on Mar. 30, 2000, which is expressly incorporated herein by reference in its entirety.

What is claimed is:

1. A multi-beam scanning device, comprising:
a light source that emits a plurality of light beams;
a polygonal mirror that deflects the light beams emitted by said light source to scan an object; and
an optical system that converges the deflected light beams on a plurality of objects to be scanned, the plurality of objects being arranged on a side, with respect to said polygonal mirror, in which said light beams scan, from a position closer to said polygonal mirror to a position farther from said polygonal mirror,
said optical system including a plurality of optical path turning systems that turn optical paths of the deflected light beams, each of said optical path turning systems comprising a first reflection surface, the first reflection surface of each of said optical path turning systems being separate from the first reflection surface of every other optical path turning system, each of said first reflection surfaces being positioned along a direction in which the light beams are deflected by the polygonal mirror, optical path lengths of the optical paths being substantially the same, and all of said optical path turning systems including an even number of reflection surfaces, wherein the optical path turning system which is the farthest away from the polygonal mirror includes a prism having two reflection surfaces, said first reflection surface being one of the two reflection surfaces of said prism.

2. The multi-beam scanning device according to claim 1, further comprising an fΘ lens including a first lens, a second lens and a plurality of third lenses, all the deflected light beams passing through said first lens and said second lens, each deflected light beam passed through said first lens and said second lens passing through one of the plurality of third lenses, said plurality of optical path turning systems receiving said plurality of light beams that emerge from said second lens and directing the received light beams to said plurality of third lenses.

3. The multi-beam scanning device according to claim 2, each of said optical path turning systems including said first reflection surface and a second reflection surface, each light beam emerged from said second lens being incident on the first reflection surface of one of said optical path turning systems, each optical path including a first optical path defined between said second lens and said first reflection surface, a second optical path defined between said first reflection surface and said second reflection surface, and a third optical path defined between said second reflection surface and said objects.

4. The multi-beam scanning device according to claim 3, wherein the third optical path located closest to said polygonal mirror passes between said polygonal mirror and said first lens.

5. The multi-beam scanning device according to claim 4, wherein at least one of said optical path turning systems includes a first mirror and a second mirror, said first reflection surface being a reflection surface of said first mirror, said second reflection surface being a reflection surface of said second mirror.

6. The multi-beam scanning device according to claim 4, wherein said second reflection surface is one of the reflection surfaces of said prism.

7. The multi-beam scanning device according to claim 4, wherein at least one of said optical path turning systems includes a prism having a reflection surface and a mirror having a reflection surface, said first reflection surface being one of the reflection surfaces of said prism and said mirror, said second reflection surface being the other one of the reflection surfaces of said prism and said mirror.

8. The multi-beam scanning device according to claim 4, wherein each of said optical paths is configured such that the third optical path intersects with the first optical path.

9. The multi-beam scanning device according to claim 4, wherein each of said optical paths is configured such that the beam proceeding along the second optical path is directed on an opposite side, with respect to the first optical path, of said objects to be scanned.

10. The multi-beam scanning device according to claim 4, wherein said first lens has a positive power mainly in a main scanning direction in which the plurality of light beams scan.

11. The multi-beam scanning device according to claim 4, said second lens having a positive power only in a main scanning direction in which the plurality of light beams scan.

12. The scanning device according to claim 4, wherein each of said third lenses has a positive power mainly in an auxiliary scanning direction, which is perpendicular to a main scanning direction where the light beams scan.

13. The multi-beam scanning device according to claim 1, wherein each of said optical path turning systems has the same number of reflection surfaces.

14. The multi-beam scanning device according to claim 1, wherein said optical path turning systems converge the deflected light beams on said plurality of objects, said plurality of objects being arranged in a plane substantially parallel to the deflected light beams.

15. The multi-beam scanning device according to claim 1, wherein each of said optical path turning systems reflect a deflected light beam an even number of times.

* * * * *